United States Patent [19]

Hiatt

[11] 3,719,645

[45] March 6, 1973

[54] POLYARYLENE TETRASULFIDE POLYMERS

[75] Inventor: Norman A. Hiatt, Hamden, Conn.

[73] Assignee: Uniroyal, Inc., New York, N.Y.

[22] Filed: Sept. 17, 1971

[21] Appl. No.: 181,633

[52] U.S. Cl. ................260/79, 117/128.4, 156/327, 161/140, 161/213, 260/79.1
[51] Int. Cl. ............................................C08g 23/00
[58] Field of Search................................260/79, 79.1

[56] References Cited

OTHER PUBLICATIONS

N. A. Hiatt, Polymerization of Cyclic Bis(Arylene Tetrasulfides), Polymer Preprints, Vol. 13, No. 1 (April 1972). PP. 594 to 596, American Chemical Society

*Primary Examiner*—Donald E. Czaja
*Assistant Examiner*—Melvyn I. Marquis
*Attorney*—Willard R. Sprowls

[57] ABSTRACT

Monomeric cyclic diarylene bis-tetrasulfides are polymerized by heat alone at temperatures of 130°–210° C. to form new linear high polymers that are useful as adhesives, protective coatings, and formed articles.

For metal-to-metal adhesion, the polymers may be formed directly from the monomers at the locus of their application, between two metal surfaces to be adhered together, by heat and pressure.

For use as adhesive solutions, the polymers are produced by heating them in bulk or in solution in a solvent, the product in solution being useful in tire building, and for coating metallic and other surfaces.

9 Claims, No Drawings

POLYARYLENE TETRASULFIDE POLYMERS

BACKGROUND OF THE INVENTION

Polymeric polysulfides of aliphatic character, the so-called "olefine polysulfide" elastomers, have been known for many years in commerce.

Linear poly(arylene monosulfides) are known — U.S. Pat. Nos. 3,274,165 and 3,380,951.

The monomeric diarylene bis-tetrasulfides used in carrying out the present invention are those described in the pending U.S. application of Z. S. Ariyan, Ser. No. 804,998, filed Mar. 6, 1969.

THE INVENTION

My polymers are characterized structurally as being composed of repeating units of certain substituted phenylene moieties linked by intervening groups of four sulfur atoms, and are represented by the following general formula:

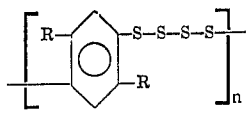

wherein each R may be —OR' or —SR', R' being a primary or secondary alkyl of one to 10 carbon atoms or a phenalkyl of seven or eight carbon atoms, or one R may be Cl, Br, or I provided that the other R is —OR' or —SR' as defined above: and n has values in the range from 10 to about 60.

The monomeric diphenylene bis(tetrasulfides) employed for making my polymers have the following general formula:

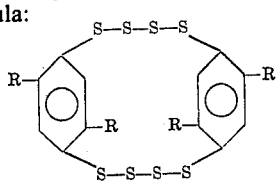

wherein each R may be —OR' or —SR' as previously defined, or one R on each phenylene may be Cl, Br, or I provided that the other is —OR' or —SR' as defined.

Physically, the polymers are amorphous solids having glass transition temperatures of about 50°C. and having an orange appearance in the fused state but yellow in the powdered state.

The polymers are prepared by heating the monomeric diphenylene bis-tetrasulfides under various conditions, the choice of particular conditions depending in part on the intended use of the polymers.

The tricyclic, monomeric bis-tetrasulfides may be polymerized by heat, in bulk in glass or ceramic vessels, at temperatures ranging from 130°C. to 210°C. for various lengths of time. The glassy, orange solid thus produced may be ground to a yellow powder; or it may be dissolved in a solvent, e.g., chloroform, and mixed with methanol to precipitate a yellow powder which may be dried at temperatures ranging from 25° to about 100°C., with or without vacuum.

The polymers may also be produced as powders by heating the monomers in solution in suitable solvents, e.g., bromobenzene or styrene oxide, at temperatures of from 130°C. to 200°C. Other suitable solvents include chlorinated hydrocarbons, e.g., chloroform, carbon tetrachloride, chlorobenzene. The polymer solution is then diluted, if so desired, as with chloroform, and precipitated by methanol as before.

The polymers may be produced in the form of films, sheets, or plates by placing a quantity of the monomer between plates of Teflon-coated metal, and heating the assembly at temperatures of 130°C. to 210°C. and at pressures ranging from zero to 40,000 psi for, say, three-quarters of an hour.

When similarly pressed and heated in direct contact with metal surfaces, the polymer forms a strong, permanent bond with the metals.

Solutions of my polymers are useful in the production of protective coatings which are resistant to alcohols, acids, and aliphatic and aromatic solvents. Other uses are for making laminated skins (for airplanes), transmission clutch discs (automotive), and rubber-to-metal adhesives.

EXAMPLE 1

Polymerization of 7,15,17,19-Tetra-ethoxy-2,3,4,5,10,11,12,13-octathiatricyclo[12,2,2,2$^{6,9}$] eicosa-6,8,14,16,17,19-hexaene (I) in Bulk (optimum conditions).

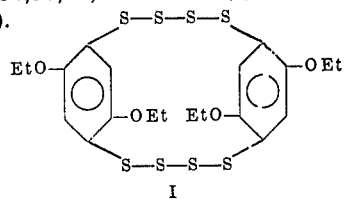

Compound I (5 g.) was placed in a glass vessel and heated by an oil bath at 195°C. for 1 hour. A viscous orange fluid was obtained which solidified to a hard, orange, glassy material on cooling. It was dissolved in chloroform and precipitated into methanol, after which the resulting yellow powdery polymer was dried under reduced pressure at 50°C. for 5 hours. The yield of polymer was 4.8 g.

Analysis:
Calc: (for $C_{10}H_{12}S_4O_2$) C 41.1, H 4.1, S 43.8
found: C 41.1, H 4.1, S 41.3

The reduced viscosity of a chloroform solution (0.4 g./100 ml.) at 30°C. was 0.21. The glass transition temperature (Tg) was 49°C. as determined by differential scanning calorimetry. The molecular weight was found by osmometry to be about 15,800, connoting an $n$ value of 54.

The polymer is useful as a metal-to-metal adhesive and as a tire cord adhesive.

EXAMPLE 2

Polymerization of Compound I in a Hot Press.

Compound I (1 g.) was placed between two Teflon-coated steel plates at contact pressure for 1 hour at 195°C. On cooling, an orange, glassy cohesive film was obtained. It was purified in the same manner and had the same properties and uses as the material described in example 1.

EXAMPLE 3

Polymerization of Compound I in Solution.

Compound I (2-g. portions) was dissolved in bromobenzene (2-g. portions) and heated to 150°C. with stirring. The systems were maintained at 150°C. for 16 hours and for 3 days, respectively, after which viscous, yellow-orange solutions resulted. The solutions were diluted with chloroform, and solid polymers were precipitated into methanol, after which they were dried in vacuo at 50°C. for 5 hours. The yield of polymer in each case was 1.8 g. The reduced viscosity of chloroform solutions (0.4 g./100 ml.) at 30°C. were 0.06 and 0.08, respectively, and the molecular weights were 4650 and 7130, connoting polymer chain lengths of about 16 and 24 unit segments, respectively (i.e., $n=16$ and 24). The polymer made by 16 hours' heating had a Shore (D) hardness of 78.

In comparison, the process of Ariyan yields the tricyclic monomers described therein and a small amount of an oily or soft, gummy material having a molecular weight of 614 and hence an n value (degree of polymerization) of only 2.

Polymers were prepared from diphenylene bis(tetrasulfides) in which the R substituents were methoxy, in one, and methoxy and chloro in another, as exemplified in Examples 4 and 5 below.

EXAMPLE 4

Polymerization of Cyclic Bi(2,5-bis-dithio-1,4-dimethoxybenzene) (II)

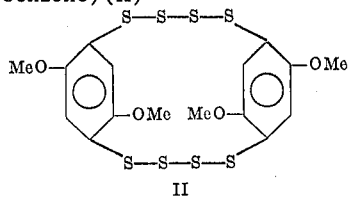

II

Compound II (5 g.) was placed in a glass vessel and heated by an oil bath at 220°C. for 1 hour. A viscous, orange fluid was obtained which solidified to a hard, orange, glassy material on cooling. It was dissolved in chloroform and precipitated into methanol, after which the resulting yellow powdery polymer was dried under reduced pressure at 50°C. for 5 hours. The yield of polymer was 4.6 g.

Analysis:
  Calc: (for $C_8H_8S_4O_2$) C 36.4, H 3.0, S 48.5
  Found:  C 35.7, H 2.9, S 47.3

The reduced viscosity of a chloroform solution (0.4 g./100 ml.) at 30°C. was 0.08 (hence, $n = 24$). The glass transition temperature (Tg) was 80°C. as determined by differential scanning calorimetry.

The polymer is useful as a metal-to-metal adhesive and as a tire cord adhesive.

EXAMPLE 5

Polymerization of Cyclic Bi(2,6-bis-dithio-4-chloroanisole) (III)

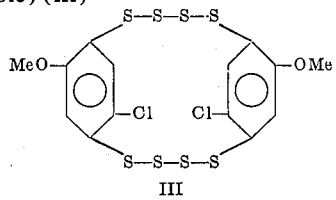

III

Compound III (5 g.) was placed in a glass vessel and heated by an oil bath at 195°C. for 1 hour. A viscous, orange fluid was obtained which solidified to a hard, orange, glassy material on cooling. It was dissolved in chloroform and precipitated into methanol, after which the resulting yellow powdery polymer was dried under reduced pressure at 50°C. for 5 hours. The yield of polymer was 4.6 g.

Analysis:
  Calc: (for $C_7H_5S_4ClO$) C 31.3, H 1.9, S 47.6, Cl 13.2
  found:  C 30.0, H 1.9, S 45,8, Cl 12.8

The reduced viscosity of a chloroform solution (0.4 g./100 ml.) at 30°C. was 0.04 ($n = 10$). The glass transition temperature (Tg) was 30°C. as determined by differential scanning calorimetry.

The polymer is useful as a metal-to-metal adhesive and as a tire cord adhesive.

EXAMPLE 6

Metal-to-Metal Adhesion

Two standard steel plates were bonded together using one of the polyarylene tetrasulfides described above. Five separate samples were prepared and tested for shear strength according to ASTM test method D2564–66T. In the sample preparation, steel plates were substituted for the PVC described in the ASTM procedure. Before bonding, the steel plates were sanded with emery cloth and cleaned with acetone. One-half gram of the powdered bis-tetrasulfide monomer used in Example 1 was placed between the plates, for each of the five samples. These were then placed in a hot press under contact pressure for three-quarters hour at a temperature of 190°C. During this operation, the bis-tetrasulfide became polymerized and bonded to the steel.

| Sample No. | Shear Strength (psi) |
|---|---|
| 1 | 75 |
| 2 | 198 |
| 3 | 155 |
| 4 | 509 |
| 5 | 170 |

In samples 1–3 and 5, bond failure was in the adhesive layer rather than at the adhesive-steel interface. Similar results are obtained when the polymer is applied to the metal plates as a solution and the solvent is driven off. In comparison, the dimeric material of Ariyan, being an oil or a soft gum, has no shear strength whatever.

EXAMPLE 7

Steel Tire Cord Adhesion

The samples were prepared and tested according to ASTM procedure D2229–63T. The data are as follows for the tetra-ethoxy-substituted polyarylene tetrasulfide polymer of Example 1:

| Curing Time (min.) | Tensile | Elongation | Wire Adhesion at 250°F. |
|---|---|---|---|
| 15 | 2,190 psi | 290% | 69 psi |
| 30 | 2,000 psi | 250% | 69 psi |

Having thus described my invention, what I claim and desire to protect by Letters Patent is:

1. Polyarylene tetrasulfide polymer having the structure

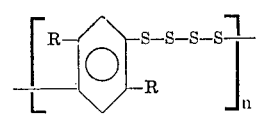

wherein each R is —OR' or —SR', R' being a primary or secondary alkyl of one to 10 carbon atoms or a phenalkyl of seven or eight carbon atoms, or one R is Cl, Br, or I provided that the other R is the said —OR' or —SR'; and n has values in the range from about 10 to about 60.

2. Polymer according to claim 1 wherein each R is ethoxy.

3. Polymer according to claim 1 wherein each R is methoxy.

4. The method of producing the polymer of claim 1 which comprises heating a monomeric, substituted-diphenylene bis(tetrasulfide) of the formula

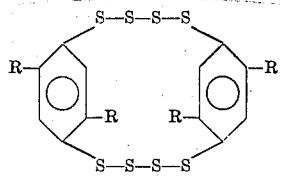

wherein each R is —OR' or —SR' as defined in claim 1, or one R on each phenylene is Cl, Br, or I provided that the other is the said —OR' or —SR', the heating taking place at temperatures in the range from 130° to 210°C.

5. The method according to claim 4 wherein the monomer is heated in bulk.

6. The method according to claim 4 wherein the monomer is heated in a layer pressed between surfaces which are non-adherent to the polymer.

7. The method according to claim 4 wherein the monomer is heated in a layer between surfaces which are adherent to the polymer formed.

8. The method according to claim 4 wherein the monomer is heated in solution.

9. An article of manufacture comprising the polymer of claim 1.

* * * * *